US008223855B2

(12) United States Patent
Xiao et al.

(10) Patent No.: US 8,223,855 B2
(45) Date of Patent: Jul. 17, 2012

(54) METHOD FOR BLINDLY DETECTING A PRECODING MATRIX INDEX

(75) Inventors: Weimin Xiao, Barrington, IL (US); Amitabha Ghosh, Buffalo Grove, IL (US); Rapeepat Ratasuk, Hoffman Estates, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 785 days.

(21) Appl. No.: 12/182,426

(22) Filed: Jul. 30, 2008

(65) Prior Publication Data
US 2009/0041140 A1    Feb. 12, 2009

Related U.S. Application Data

(60) Provisional application No. 60/955,078, filed on Aug. 10, 2007.

(51) Int. Cl.
*H04K 1/10* (2006.01)
(52) U.S. Cl. ........ 375/260; 375/316; 375/324; 375/340; 375/342; 375/347; 375/349; 375/358; 375/365
(58) Field of Classification Search .................. 375/260, 375/316, 324, 347, 348, 358, 365, 340, 342, 375/349
See application file for complete search history.

(56) References Cited

U.S. PATENT DOCUMENTS

| 7,042,963 | B1* | 5/2006 | Raith et al. ................... 375/341 |
| 7,197,084 | B2 | 3/2007 | Ketchum et al. |
| 7,734,303 | B2* | 6/2010 | Krishnamoorthi et al. ... 455/501 |
| 7,809,074 | B2* | 10/2010 | Kotecha et al. ............... 375/267 |
| 2005/0032521 | A1 | 2/2005 | Lee et al. |
| 2007/0104283 | A1 | 5/2007 | Han et al. |
| 2007/0160162 | A1 | 7/2007 | Kim et al. |
| 2007/0165738 | A1 | 7/2007 | Barriac et al. |
| 2009/0023451 | A1* | 1/2009 | Pan et al. ...................... 455/446 |

FOREIGN PATENT DOCUMENTS
EP    1679849 A1    7/2006
* cited by examiner

*Primary Examiner* — Sam K Ahn
*Assistant Examiner* — Sophia Vlahos (57) ABSTRACT

A method for blindly detecting a precoding matrix index used to transmit a data or control signal is provided. The method includes receiving at a mobile station (102) a common reference signal and user specific data and control signal weighted by precoding matrix. An objective function is applied to the received reference signal and user specific data and control signal that minimizes the objective function for each of at least one rank used to transmit the received user specific data and control signal and each of known possible modulation constellations used to transmit the received data/control signal to determine the precoding matrix index (PMI).

15 Claims, 6 Drawing Sheets

FIG. 1

| CODEBOOK INDEX | NUMBER OF LAYERS υ | |
|---|---|---|
| | 1 ~206 | 2 ~208 |
| 0 | $\begin{bmatrix}1\\0\end{bmatrix}$ ~204 | $\frac{1}{\sqrt{2}}\begin{bmatrix}1 & 0\\0 & 1\end{bmatrix}$ |
| 1 | $\begin{bmatrix}0\\1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\1\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-1\end{bmatrix}$ | - |
| 4 | $\frac{1}{\sqrt{2}}\begin{bmatrix}1\\j\end{bmatrix}$ | - |
| 5 | $\frac{1}{\sqrt{2}}\begin{bmatrix}1\\-j\end{bmatrix}$ | - |

| Codebook Index | $u_n$ | Number of Layers $\upsilon$ | | | |
|---|---|---|---|---|---|
| | | 1 | 2 | 3 | 4 |
| 0 | $u_0 = [1\ -1\ -1\ -1]^T$ | $w_0^{\{1\}}$ | $w_0^{\{14\}}/\sqrt{2}$ | $w_0^{\{124\}}/\sqrt{3}$ | $w_0^{\{1234\}}/2$ |
| 1 | $u_1 = [1\ -j\ 1\ j]^T$ | $w_1^{\{1\}}$ | $w_1^{\{12\}}/\sqrt{2}$ | $w_1^{\{123\}}/\sqrt{3}$ | $w_1^{\{1234\}}/2$ |
| 2 | $u_2 = [1\ 1\ -1\ -1]^T$ | $w_2^{\{1\}}$ | $w_2^{\{12\}}/\sqrt{2}$ | $w_2^{\{123\}}/\sqrt{3}$ | $w_2^{\{3214\}}/2$ |
| 3 | $u_3 = [1\ j\ 1\ -j]^T$ | $w_3^{\{1\}}$ | $w_3^{\{12\}}/\sqrt{2}$ | $w_3^{\{123\}}/\sqrt{3}$ | $w_3^{\{3214\}}/2$ |
| 4 | $u_4 = [1\ (-1-j)/\sqrt{2}\ -j\ (1-j)/\sqrt{2}]^T$ | $w_4^{\{1\}}$ | $w_4^{\{14\}}/\sqrt{2}$ | $w_4^{\{124\}}/\sqrt{3}$ | $w_4^{\{1234\}}/2$ |
| 5 | $u_5 = [1\ (1-j)/\sqrt{2}\ j\ (-1-j)/\sqrt{2}]^T$ | $w_5^{\{1\}}$ | $w_5^{\{14\}}/\sqrt{2}$ | $w_5^{\{124\}}/\sqrt{3}$ | $w_5^{\{1234\}}/2$ |
| 6 | $u_6 = [1\ (1+j)/\sqrt{2}\ -j\ (-1+j)/\sqrt{2}]^T$ | $w_6^{\{1\}}$ | $w_6^{\{13\}}/\sqrt{2}$ | $w_6^{\{134\}}/\sqrt{3}$ | $w_6^{\{1324\}}/2$ |
| 7 | $u_7 = [1\ (-1+j)/\sqrt{2}\ j\ (1+j)/\sqrt{2}]^T$ | $w_7^{\{1\}}$ | $w_7^{\{13\}}/\sqrt{2}$ | $w_7^{\{134\}}/\sqrt{3}$ | $w_7^{\{1324\}}/2$ |
| 8 | $u_8 = [1\ -1\ 1\ 1]^T$ | $w_8^{\{1\}}$ | $w_8^{\{12\}}/\sqrt{2}$ | $w_8^{\{124\}}/\sqrt{3}$ | $w_8^{\{1234\}}/2$ |
| 9 | $u_9 = [1\ -j\ -1\ -j]^T$ | $w_9^{\{1\}}$ | $w_9^{\{14\}}/\sqrt{2}$ | $w_9^{\{134\}}/\sqrt{3}$ | $w_9^{\{1234\}}/2$ |
| 10 | $u_{10} = [1\ 1\ 1\ -1]^T$ | $w_{10}^{\{1\}}$ | $w_{10}^{\{13\}}/\sqrt{2}$ | $w_{10}^{\{123\}}/\sqrt{3}$ | $w_{10}^{\{1324\}}/2$ |
| 11 | $u_{11} = [1\ j\ -1\ j]^T$ | $w_{11}^{\{1\}}$ | $w_{11}^{\{13\}}/\sqrt{2}$ | $w_{11}^{\{134\}}/\sqrt{3}$ | $w_{11}^{\{1324\}}/2$ |
| 12 | $u_{12} = [1\ -1\ -1\ 1]^T$ | $w_{12}^{\{1\}}$ | $w_{12}^{\{12\}}/\sqrt{2}$ | $w_{12}^{\{123\}}/\sqrt{3}$ | $w_{12}^{\{1234\}}/2$ |
| 13 | $u_{13} = [1\ -1\ 1\ -1]^T$ | $w_{13}^{\{1\}}$ | $w_{13}^{\{13\}}/\sqrt{2}$ | $w_{13}^{\{123\}}/\sqrt{3}$ | $w_{13}^{\{1324\}}/2$ |
| 14 | $u_{14} = [1\ 1\ -1\ 1]^T$ | $w_{14}^{\{1\}}$ | $w_{14}^{\{13\}}/\sqrt{2}$ | $w_{14}^{\{123\}}/\sqrt{3}$ | $w_{14}^{\{3214\}}/2$ |
| 15 | $u_{15} = [1\ 1\ 1\ 1]^T$ | $w_{15}^{\{1\}}$ | $w_{15}^{\{12\}}/\sqrt{2}$ | $w_{15}^{\{123\}}/\sqrt{3}$ | $w_{15}^{\{1324\}}/2$ |

METHOD FOR BLINDLY DETECTING A PRECODING MATRIX INDEX

FIELD OF THE INVENTION

The present invention relates generally to detecting the precoding matrix index for a signal and, in particular, to a mobile station blindly detecting the precoding matrix index used by a base station from a signal sent by the shared and signaling channel and using the common reference signal.

BACKGROUND

As set by the standards, downlink Multiple Input Multiple Output (MIMO) antennas in a Evolved Universal Terrestrial Radio Access (E-UTRA) communication system are precoded using a defined unitary codebook. The throughput and coverage of data and control channel is significantly improved by closed loop MIMO using preceding. A mobile station can select the rank and precoding vector based on the available number of receive and transmit antennas and the known precoding matrix indexes (PMI). The base station, or Node-B, uses the selected PMI it receives from the mobile station in configuring the weights on the MIMO transmit antennas and transmitting signals to the mobile stations over the shared and signaling channel.

Nonetheless, there is a requirement that the base station signals the relevant mobile stations the PMI that is being used to transmit data using the shared channel and control signaling using the control channel. Even though the mobile station selected a PMI, that PMI may not be the index used by the base station. For example, the base station may have misunderstood the originally selected PMI, or the base station may have data unknown to the mobile station that makes a choice for a different PMI more appropriate than the one originally selected by the mobile station.

A base station can notify the mobile station of the PMI used by the base station and use dedicated reference signal to demodulate the PMI information. This technique of notification increases downlink overhead and increases the system complexity since multiple modes have to be supported. Signaling in the downlink control channel can also be used to notify the mobile station of the PMI used by the base station. This method of notification also increases downlink signaling overhead, also increases the system complexity since multiple formats of control channel have to be supported and the control channel itself cannot be using preceding.

In view of the foregoing, there is a need in which mobile station can detect the PMI used by the base station without additional overhead.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to blindly detecting a precoding matrix index (PMI) used to transmit signals from a base station to a mobile station. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of blindly detecting a PMI used to transmit signals from a base station to a mobile station. The non-processor circuits may include, but are not limited to, a radio receiver, a radio transmitter, signal drivers, clock circuits, power source circuits, and user input devices. As such, these functions may be interpreted as steps of a method to perform a method of blindly detecting a PMI used to transmit signals from a base station to a mobile station. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention is related to a method of receiving at a mobile station a data or control signal using multiple antennas weighted by the precoding matrix. Upon receipt of the common reference signal along with the data and control signal the mobile station can determine the user specific information such as the PMI using known possible modulation constellations and known candidates of the user specific information such as the PMI. In an embodiment, the present invention is directed to a method of receiving at a mobile station a common reference signal, which is not weighted by the PMI, and a user specific data and control signals that are weighted by a precoding matrix and minimizing an objective function for each of at least one rank used to transmit the data and control signals and each of known possible modulation constellations used to transmit the data and control signals to determine the precoding matrix index used to transmit the user specific data or control signal.

Figure 1:
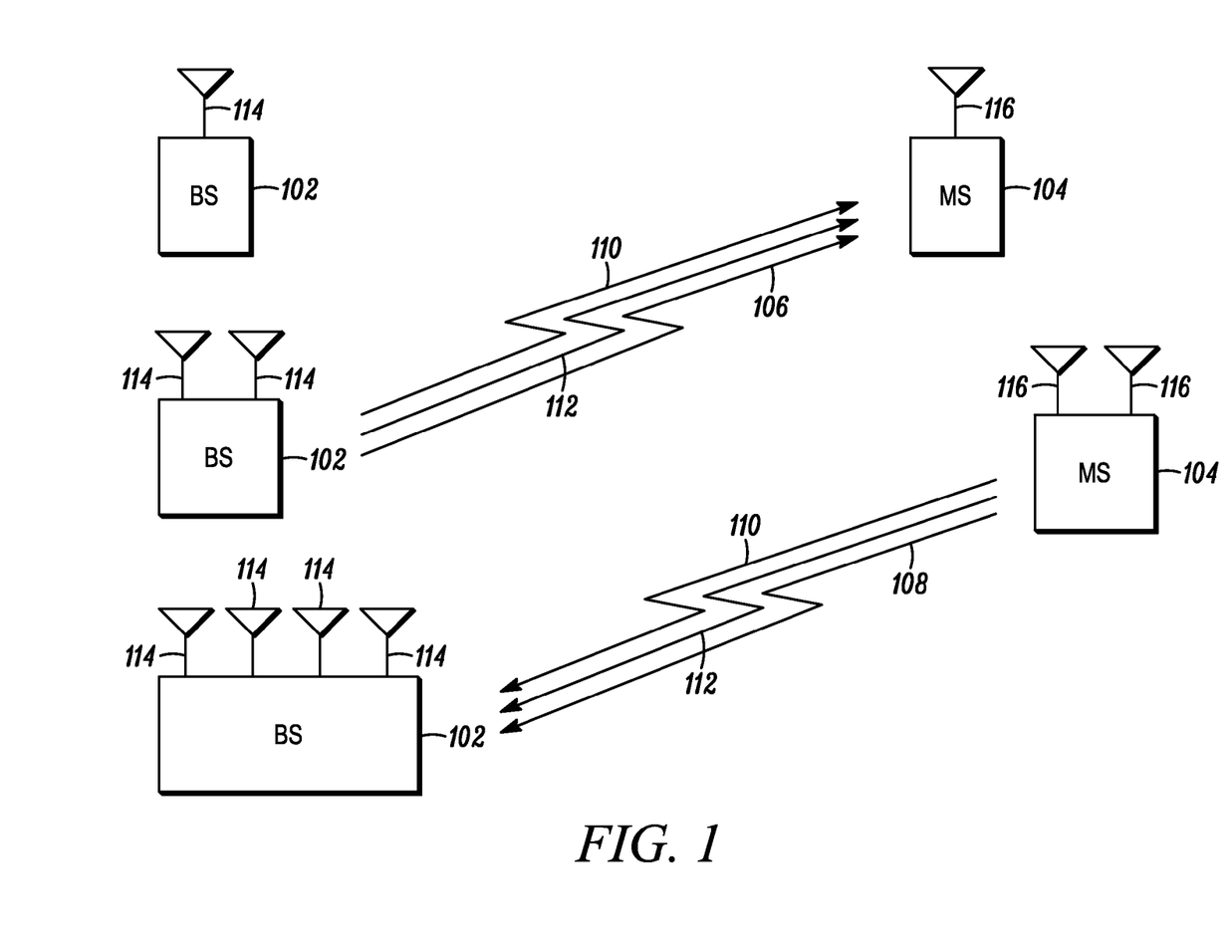
FIG. 1 is an example of a communication network in which some embodiments of the invention are used.

Turning to FIG. 1, a communication system 100 used in accordance with the principles of the present invention is shown. In an embodiment the system 100 is a wireless communication system that includes a plurality of base stations 102. In addition to the base stations 102, the system 100 includes other network components and servers (not shown) that operate according various wireless communication protocols including E-UTRA. As is known, base stations transmit signals to and receive signals from mobile stations 104 that operate within the system 100. The signals transmitted from the base stations to the mobile stations are transmitted on downlinks 106. The signals transmitted from the mobile stations to the base stations are transmitted on the uplinks 108. Within each downlink and uplink there are multiple channels including shared common channels 110 and control channels 112.

System 100 can be configured as a Multiple Input, Multiple Output (MIMO) system where the base stations 102 and mobile stations 104 are configured with multiple antennas. In an embodiment of system operating using MIMO, base stations 102 can be configured with either 1, 2 or 4 antennas 114, and mobile stations can be configured with either 1 or 2 antennas 116. During downlink operations, antennas 114 operate as transmit antennas, and antennas 116 operate as receive antennas. During uplink operations, antenna 114 operates as receive antenna, and antennas 116 operate as transmit antennas. Moreover, the number of streams that each antenna 114 at a base station transmits is known as the rank of the MIMO transmission.

Figure 2:
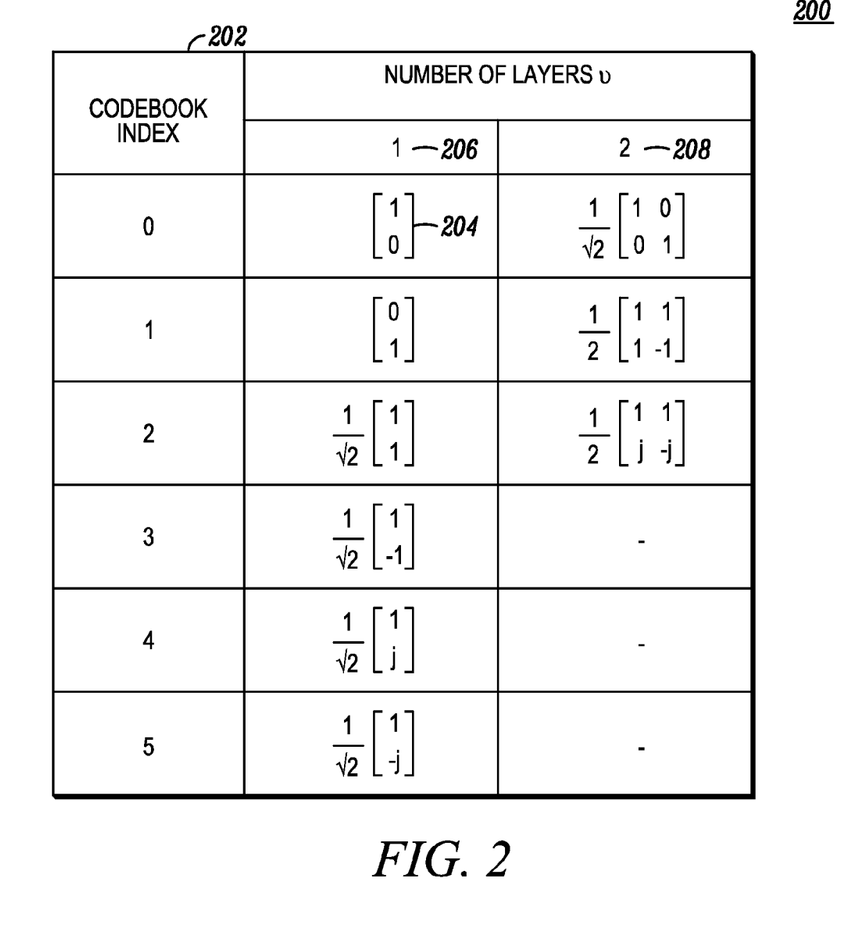
FIG. 2 is a codebook for transmission using two antennas.
Figure 3:
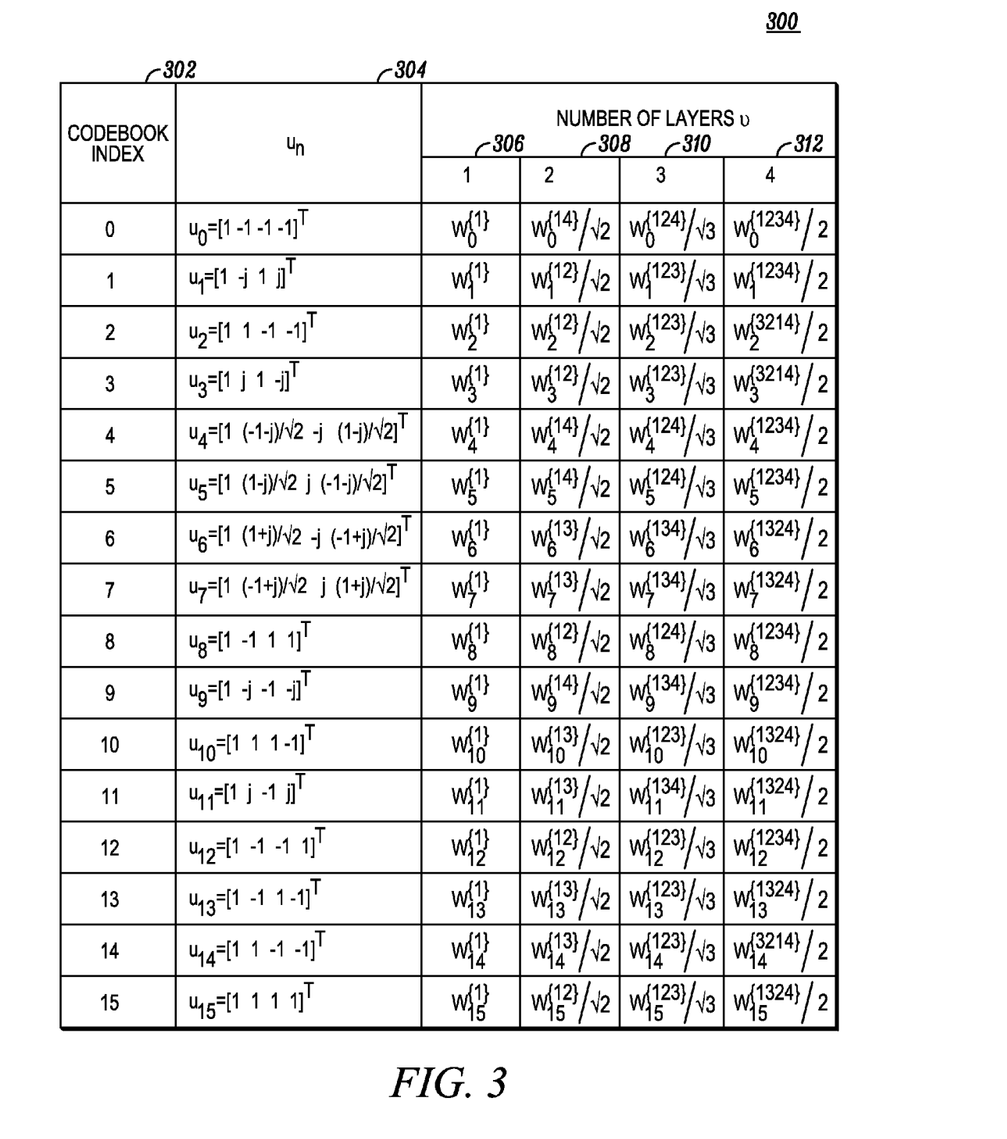
FIG. 3 is a codebook for transmission using four antennas.

In addition, each antenna 114 transmits signals on the downlink using a specific codebook or precoding matrix (PM) that is known by both the base station 102 and the mobile station 104. According to the 3$^{rd}$ Generation Partnership Project (3GPP) that sets the standards for E-UTRA, a mobile station designates a codebook index and rank for signals to be transmitted by the base station over the antennas 114 and so that the mobile station can decode the data and control signals at each antenna 116 appropriately. Based on the designated codebook index and rank, a designated precoding matrix is used to transmit the signals for a given antenna. Codebooks 200, 300 as set by 3GPP for two base station antennas is shown in FIG. 2 and for four base station antennas is shown in FIG. 3. In FIG. 2, the codebook 200 includes codebook index 202 and the values 204 sent for each of the antenna 206 208. For example, a codebook index of 0 corresponds to a PM of $$\begin{bmatrix} 1 \\ 0 \end{bmatrix}$$

for a first antenna 206 and second antenna 208 transmitting one stream and a PM of $$\frac{1}{\sqrt{2}} \begin{bmatrix} 1 & 0 \\ 0 & 1 \end{bmatrix}$$

for a first antenna 206 and second antenna 208 for two streams. For a codebook index of 1 a PM is set to $$\begin{bmatrix} 0 \\ 1 \end{bmatrix}$$

for a first antenna 206 and second antenna 208 using one stream, and a PM is set to $$\frac{1}{2} \begin{bmatrix} 1 & 1 \\ 1 & -1 \end{bmatrix}$$

for the a first antenna 206 and second antenna 208 for two streams.

Turning to FIG. 3, a codebook 300 includes a codebook index 302 that has a PM 304 for each of the antennas 306, 308, 310, 312. As described above, a codebook index and rank is selected for transmission of signals from the base station 102 to the mobile station 104. Codebook index 302 includes the necessary PM 304 for each rank and antenna configuration for transmission on four antennas. The quantity $W_n^{\{s\}}$ denotes the matrix defined by the columns given by the set $\{s\}$ of antennas and where n is the rank. For example, a codebook index of 0 designates that the PM is based on $u_0 = [1 -1 -1 -1]^T$ and $W_0^{\{1\}}$ for one antenna and a rank of 1 such that the precoding matrix is [1], $W_0^{\{14\}}/\sqrt{2}$ for two antenna and rank of 2 such that the precoding matrix is $[1/\sqrt{2}]$ for the first stream and $[-1/\sqrt{2}]$ for the second stream. Therefore the first value in $u_0$ matrix is used as the PM and the first and fourth values of $u_0$ are used as the PM when the rank is 2.

As mentioned, the mobile station 104 selects a rank and a codebook index for the base station 102 in transmitting data and control signals to the mobile station. Nonetheless, the base station 102 may not correctly receive the signal which has the mobile station's selections or the base station may determine that a different rank and codebook index is appropriate to send signals on the downlink. A mobile station therefore needs to be able to interpret the downlink signals and determine user specific information such as the PMI that is being used to transmit signals from the base station to the mobile station. In an embodiment, the mobile station can blindly determine and detect the PMI using common reference signals as a reference for channel estimation and the shared data and control signaling channel without relying on any dedicated control resources. By blindly determining the PMI, there is no need for the base station and mobile station to use a dedicated reference signal or signaling the PMI in the downlink control channel or mobile station dictated PMIs. These other methods increase downlink overhead, increase the system complexity since multiple modes have to be supported, prohibit the control channel from using precoding, reduces flexibility and increases errors.

Figure 4:
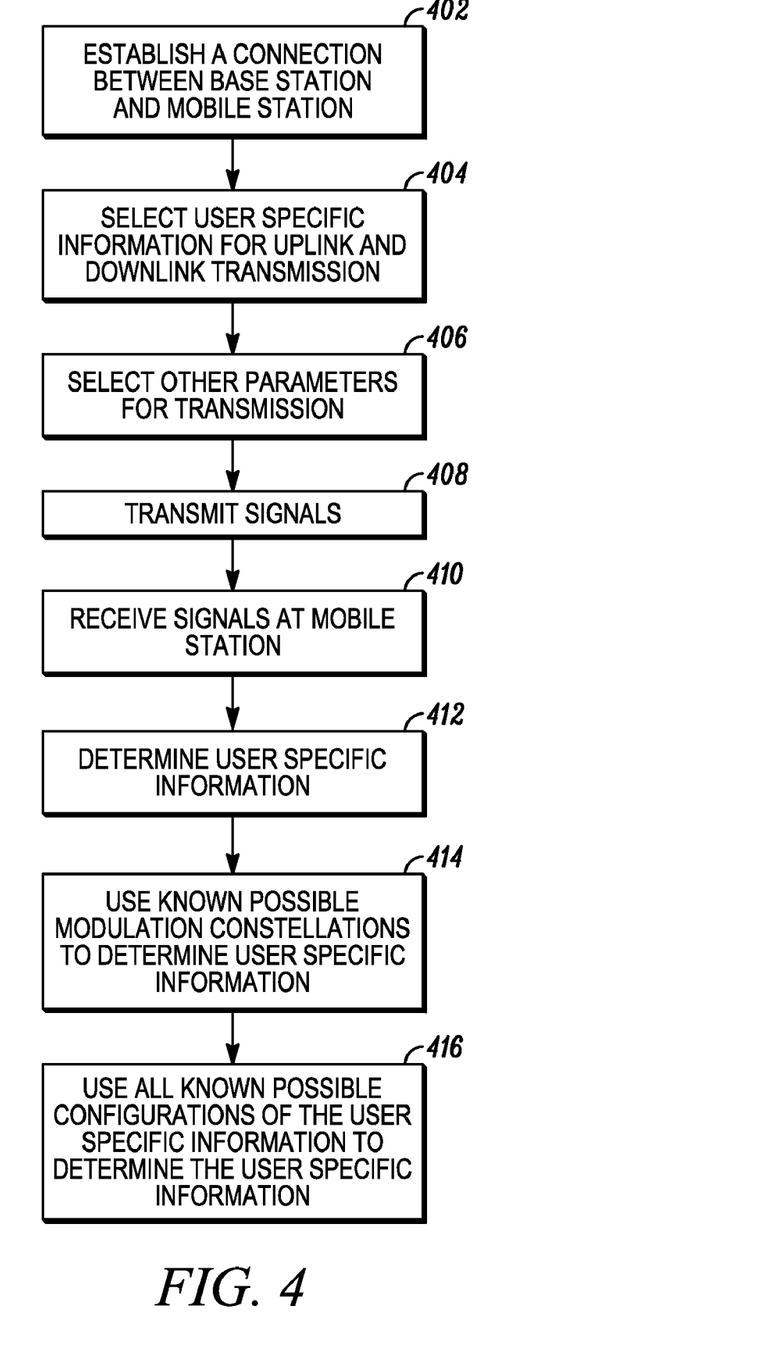
FIG. 4 is a flow diagram illustrating blindly detecting a precoding matrix index of some embodiments of the invention.

FIG. 4 illustrates a flow chart 400 of an embodiment for blindly detecting a user specific information from a common reference signal. To begin, a connection is established 402 between a base station 102 and mobile station 104 in MIMO-based systems. The connection can be initiated by either the base station or the mobile station. As a part of establishing the connection, user specific information that is used in transmitting downlink and uplink signals are selected 404. In an embodiment, the mobile station selects user specific information for both the downlink and uplink transmissions. In an alternative embodiment, the base station selects the user specific information for at least the downlink transmissions. Other parameters can also be selected or designated 406 for the downlink transmissions. After all the parameters are selected, the base station 102 transmits 408 signals to the mobile station 104 using various channels on the downlink. These channels include the downlink shared channel and the downlink control channel. Control signals are sent on the control channel, which is used for dedicated control data between a base station and a specific mobile station. Also, independent common reference signals are sent from each of the downlink transmit antennas.

A mobile station then receives 410 a common reference signal that will be used for channel estimation and decoding the shared data channel and the control channel. The mobile station determines 412 the user specific information using known information regarding the downlink transmission. In an embodiment, the mobile station uses 414 known possible modulation constellations, e.g. QPSK, 16QAM, etc., that are used to transmit the received data and control signal. For example, the mobile station uses all 16 possible constellations that are known to transmit a 16QAM signal as a part of the determination of the user specific information. In addition, the mobile station uses 416 each of the known possible configurations of the user specific information that are used to transmit the received signals. For example, the mobile station uses all the possible precoding matrix that can be used to transmit a signal for a given rank. Based on the known possible modulation constellations and the known candidates of the user specified information, the mobile station blindly determines the user specific information by comparing the possible combinations of constellations and user specific information to the received data and control signal.

As mentioned, user specific information can include the index of the precoding matrix used to transmit the user specific data and control signals over the downlink shared channel. As understood, the precoding matrix and the PMI can be derived from one another. An embodiment of the present invention to determine the PMI or precoding matrix used for a data and control signal received by a mobile station 104 is shown in the flow chart 500 of FIG. 5. Similar to process 400, the mobile station receives 502 a common reference signal and the data and control signals using a precoding matrix by the base station 102. The mobile station applies 504 an objective function to at least one of the received data or control signal. The mobile station minimizes 506 the objective function for each of the possible modulation constellations. For example, the mobile station minimizes the objective function for each of the 16 constellations used to transmit a 16QAM signal to determine which constellation was used to transmit the received data or control signal.

Figure 5:
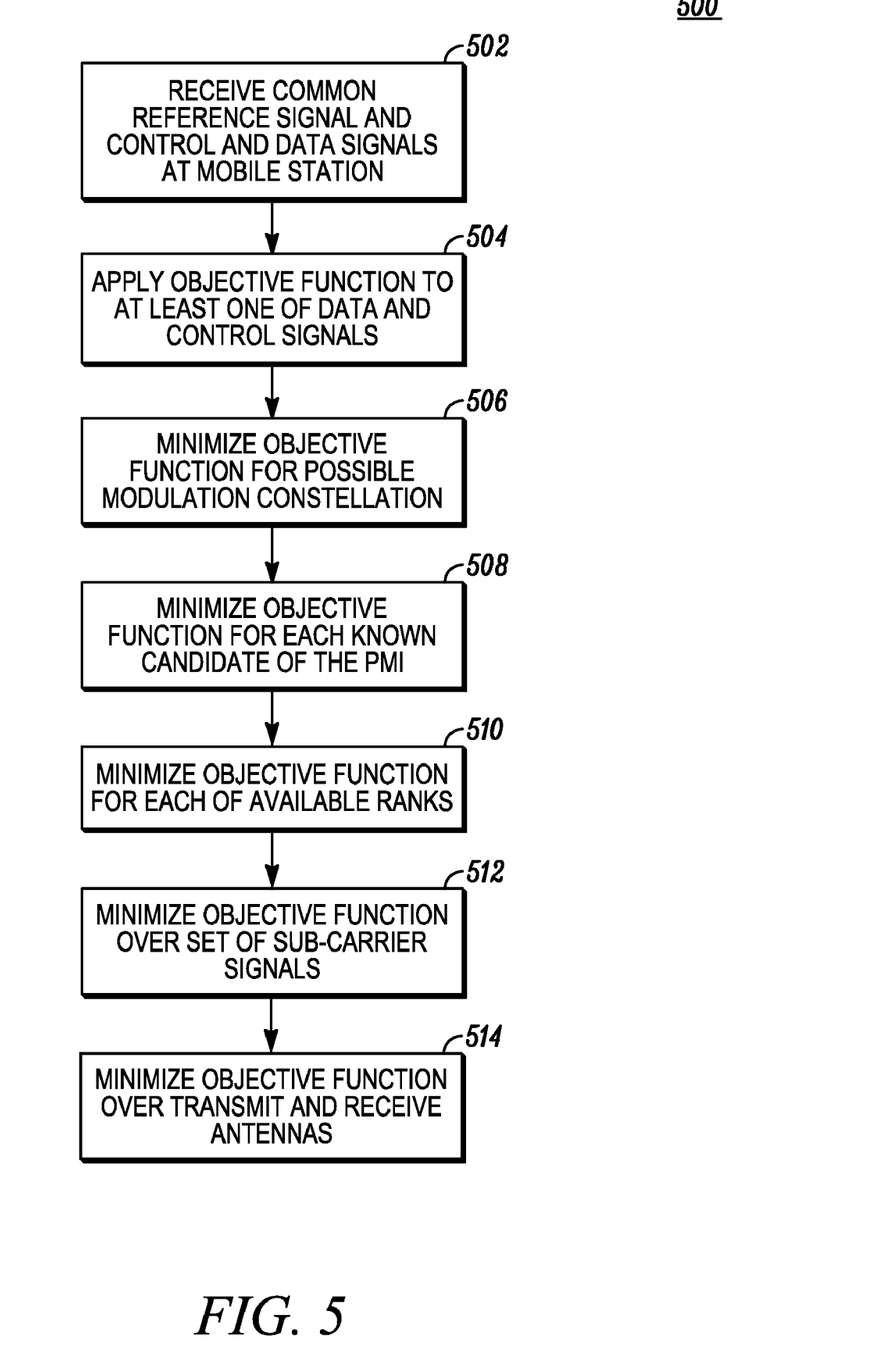
FIG. 5 is a flow diagram illustrating blindly detecting a precoding matrix index of some embodiments of the invention.

In addition, the mobile station minimizes 508 the objective function for each of the known candidates of the PMI or precoding matrix used in transmitting the data and control signals. For example, the mobile station minimizes the objective function to determine the modulation constellation used to transmit the data and control signal and then minimizes the objective function for each PMI candidate that can be used to modulate that determined constellation used to transmit the data and control signal. In addition, the objective function can minimize 510 the objective function for each of the available ranks used to transmit the signal over the shared channel and the signaling over the control channel. For example, the mobile station minimizes the objective function to determine the rank from the known ranks together with minimizing the signal for the modulation constellation based on the known modulation constellations used to transmit the common reference signal as well minimizing the objective function for each of the possible precoding matrix used to code the transmitted downlink signal.

Moreover, the mobile station minimizes 512 the objective function to determine the PMI used to transmit the downlink signal over a set of sub-carrier signals used to transmit data or control signals. These sub-carrier signals are used for at least one antenna at the base station 102 and can be either narrowband sub-carriers or wideband sub-carriers. Regardless, the objective function minimizes over each of the sub-carriers for an antenna at the base station 102. In an embodiment, the mobile station minimizes 514 over each of a plurality of antennas used to transmit the signals from the base station and each of a plurality of antennas used to receive the signals at the mobile station.

In an embodiment, the mobile station 104 receives a data and control signal on the downlink channel on the $i^{th}$ sub-carrier of a narrowband or wideband signal. The received signal can be represented as:

$$X_i = \sum_{j=1}^{N} w_{yj} H_{ij} s_i + n_i$$

where $H_{ij}$ is the corresponding channel response in the frequency domain for the $i^{th}$ sub-carrier from the $j^{th}$ transmit antenna at the base station 102, $s_i$ is the transmitted modulation symbol on the $i^{th}$ sub-carrier, $n_i$ is the noise and interference and precoding vector $W_y = [w_{y1}, \ldots, w_{yN}]$ is used for transmission with N transmit antennas.

In the case where the modulation of the transmitted symbols $s_i$ are known, such as QPSK or 16QAM, there is a given constellation set c of $\{c_1, c_2, \ldots, c_M\}$, where M is the number of constellations configurations for each of the transmit antennas. In the case when there is one antenna at the mobile station, the PMI for the received data or control signal can be derived by minimizing the received signal according to:

$$\hat{y} = \arg\min_{1 \leq k \leq K} \sum_{i=1}^{L} \left( \min_{1 \leq m \leq M} \left| X_i - \sum_{j=1}^{N} w_{kj} \hat{H}_{ij} c_m \right|^2 \right)$$

where $\hat{y}$ is the determined PMI for the received data or control signal, $\hat{H}_{ij}$ is the channel estimation using the common reference signals, L is the total number of sub-carriers used for PMI detection and K is the total number of possible precoding vectors.

In the case the MIMO configuration at the base station 102 and mobile station 104 includes a plurality of antennas, the objective function minimizing the received common reference signal can be expanded. Thus, the determination of the PMI for the received signal extended to:

$$\hat{y} = \arg\min_{1 \le k \le K} \sum_{i=1}^{L} \left( \min_{\substack{1 \le m_r \le M \\ 1 \le r \le R}} \sum_{g=1}^{G} \left| X_{i,g} - \sum_{r=1}^{R} \sum_{j=1}^{N} w_{kj,r}^{(R)} \hat{H}_{ij,g} c_{m_r} \right|^2 \right)$$

where ŷ represents the determined PMI, X represents the received signal, w represents the known candidates for the PMIs, Ĥ represents a channel response estimated from the common reference signal in a given frequency domain, c represents the known modulation constellation, K represents a number of precoding vectors in the PMI, L represents a number of sub-carriers, M represents the total of known modulation constellations and $m_r$ represents the available modulation constellations for each rank, N represents a number of transmit antennas used for the at least one of the data and control signal, R represents a rank for the data and control signal and G represents a number of received antennas.

Accordingly, the objective function minimized over all G receiving antennas at the mobile station. Over all G receiving antennas the objective function is minimized for each rank used to transmit the received signal and over each of the carriers. In conducting each minimization, the received reference signal is examined to determine the channel response for the given frequency domain as well as the known modulation constellation used to transmit the data and control signal. For each of antenna G these candidate signals are subtracted from the received signal. The objective function is then minimized for each of the precoding matrix. This operation can be conducted over the summation of all the sub-carriers in the narrowband or wideband signal to determine the precoding matrix used to transmit the signal. By minimizing the objective function over the different combinations of known modulation constellations and vectors the actual precoding matrix used is determined.

In an embodiment, the PMI detection performance can be improved based on the knowledge of the repetition of modulation constellation that is utilized. Accordingly, a hard decision can be made for the minimization over the rank and available modulation constellations which appear at the rightmost side of the determination shown above. The reliability of this minimization can be increased by combining the coded bits and symbols before the minimizing operations and then making the hard decision when the PMI is determined. Alternatively, the user specific information or the PMI can be determined by minimizing the given objective function of the received data and control signal use a soft decision on the known modulation constellation where the soft decision includes combining the symbols prior to minimizing the received signal.

According to the methods as described in FIGS. 4 and 5, user specific information such as PMI used to transmit a data or control signal from a base station can be conducted by minimizing the objective function of the received data or control signal over a plurality of antennas at both the base station and the mobile station. The user specific information and PMI is minimized over the total number of possible PMI vectors used to transmit the data over a shared channel and signaling over the control channel. This is achieved by minimizing over all the antennas at the mobile station.

Figure 6:
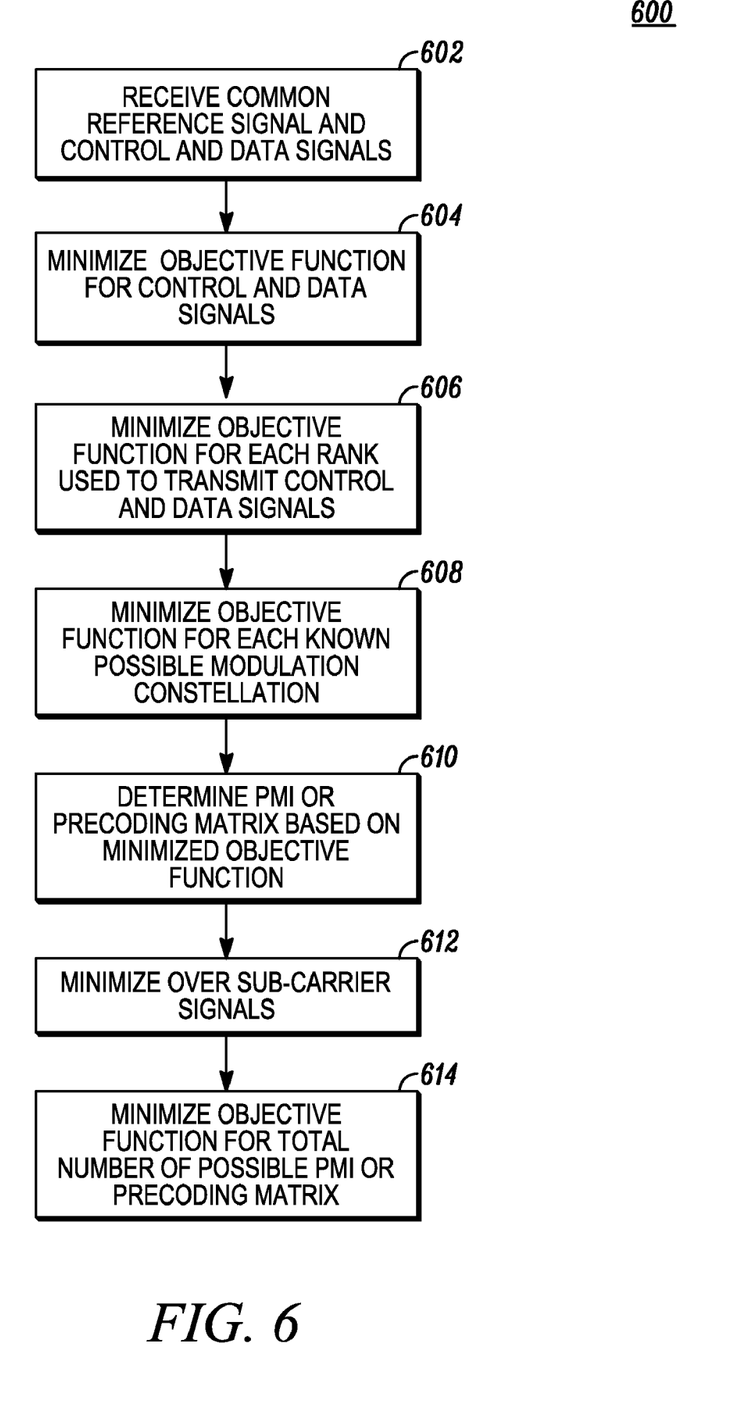
FIG. 6 is a flow diagram illustrating blindly detecting a precoding matrix index of some embodiments of the invention.

FIG. 6 illustrates a flow chart 600 of an alternative embodiment of the objective function. The mobile station receives 602 a common reference signal and user specific data and control signals weighted by a precoding matrix that was used by the base station 102 to transmit the data and control signal. The mobile station minimizes 604 an objective function to the received data and control signal. The minimization is performed 606 for each rank used to transmit the user specific data and control signals sent over the shared channels and the control channels from the base station to the mobile station. In addition, the minimization is performed 608 for each of the known possible modulation signals used to transmit the data and control signals over the shard and control channels. Based on the minimized objective function for the received signal, the mobile station determines 610 the PMI or precoding matrix used by the base station 102 to transmit the received signal on the downlink. In an embodiment, the objective function is also minimized 612 over the set of narrowband or wideband sub-carrier signals used to transmit the data signals to determine the PMI or precoding matrix. In another embodiment, the objective function is also minimized 614 for at a total number of possible PMI or precoding matrix used to transmit signals and data over a shared channel and a control channel. The objective function can also be minimized 616 over all the received antennas at the mobile station.

In an embodiment, the objective function determines the PMI by $$\hat{y} = \arg\min_{1 \le k \le K} \sum_{i=1}^{L} \left( \min_{\substack{1 \le m_r \le M \\ 1 \le r \le R}} \sum_{g=1}^{G} \left| X_{i,g} - \sum_{r=1}^{R} \sum_{j=1}^{N} w_{kj,r}^{(R)} \hat{H}_{ij,g} c_{m_r} \right|^2 \right)$$

where ŷ represents the determined PMI, X represents the received signal, w represents the known candidates for the PMIs, Ĥ represents a channel response estimated from the common reference signal in a given frequency domain, c represents the known modulation constellation, K represents a number of precoding vectors in the PMI, L represents a number of sub-carriers, M represents the total of known modulation constellations and $m_r$ represents the available modulation constellations for each rank, N represents a number of transmit antennas used for the common reference signal, R represents a rank for the data and control signal and G represents a number of received antennas.

As is understood, the sub-carrier signals are used in transmission of signals for at least one antenna in a MIMO system. Moreover, the minimizing for the PMI can be conducted over a number of transmit and receive antennas that are a part of the MIMO system and that are used to transmit signals from the base station and received at the mobile station.

In view of the foregoing, it is understood that blind detection of PMI used in transmitting downlink signals can be achieved using the knowledge of modulation constellations and the precoding codebook. Accordingly, more than one candidate of PMI can be selected to demodulate and decode the data or control channel. Transmit diversity can also be treated as one PMI so that precoding and transmit diversity can be separated blindly. Accordingly, no overhead is needed since no dedicated reference signal is used and no PMI signaling is needed.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
    receiving at a mobile station a common reference signal and user specific information and
    determining the user specific information using known possible modulation constellations and known candidates of user specific information by minimizing an objective function for all known possible modulation constellations and known candidates of precoding matrix index (PMI) to determine the PMI corresponding to data or control information and wherein the objective function is given by $$\hat{y} = \arg \min_{1 \le k \le K} \sum_{i=1}^{L} \left( \min_{\substack{1 \le m_r \le M \\ 1 \le r \le R}} \sum_{g=1}^{G} \left| X_{i,g} - \sum_{r=1}^{R} \sum_{j=1}^{N} w_{kj,r}^{(R)} \hat{H}_{ij,g} c_{m_r} \right|^2 \right)$$

where $\hat{y}$ represents the determined PMI, X represents the received user specific information, w represents the known candidates for the PMIs, $\hat{H}$ represents a channel response estimated from the common reference signal in a given frequency domain, c represents the known modulation constellation, K represents a number of precoding vectors in the PMI, L represents a number of sub-carriers, M represents the total of known modulation constellations and $m_r$ represents the available modulation constellations for each rank, N represents a number of transmit antennas used for the common reference signal, R represents a rank for at least one of a data and control signal and G represents a number of receive antennas.

2. The method of claim 1 wherein the user specific information comprises a precoding matrix index (PMI) corresponding to data or control information.

3. The method of claim 1 wherein minimizing the objective function comprises minimizing for a number of available ranks used to transmit data over a shared channel and signaling over a control channel.

4. The method of claim 1 wherein minimizing the objective function comprises minimizing the objective function over a set of sub-carrier signals used to transmit data or control signals from at least one antenna wherein the set of sub-carrier signals are used for determining the PMI.

5. The method of claim 1 wherein minimizing the objective function comprising minimizing over a plurality of antennas transmitting the data or control signals and a plurality of antennas receiving the data or control signal.

6. The method of claim 1 wherein determining the user specific information comprises determining a precoding matrix index (PMI) and minimizing for a total number of possible PMI vectors used to transmit data over a shared channel and signaling over the control channel.

7. The method of claim 1 wherein determining the user specific information comprises determining a precoding matrix index (PMI) and minimizing an objective function based on a hard decision of modulation symbols.

8. The method of claim 7 further comprising, before minimizing an objective function, combining symbols.

9. The method of claim 1 wherein determining the user specific information comprises determining a precoding matrix index (PMI) and minimizing the objective function based on a soft decision of modulation constellations.

10. The method of claim 9 further comprising, before minimizing the objective function, combining symbols.

11. The method of claim 1 wherein determining the user specific information comprises determining a precoding matrix index (PMI) and a summation for each antenna and each rank used to transmit data and control signals.

12. The method of claim 11 wherein minimizing an objective function comprises determining a precoding matrix index (PMI) and minimizing the objective function based on a soft decision of modulation symbols.

13. A method comprising:
    receiving at a mobile station a common reference signal and user specific data and control signals weighted by a precoding matrix and
    minimizing an objective function for each of at least one rank used to transmit the received user specific data and control signals and each of known possible modulation constellations used to transmit the received data and control signals over a set of sub-carrier signals used to transmit data signals from at least one antenna wherein the set of sub-carrier signals to determine the precoding matrix index (PMI) and wherein the objective function is given by $$\hat{y} = \arg \min_{1 \le k \le K} \sum_{i=1}^{L} \left( \min_{\substack{1 \le m_r \le M \\ 1 \le r \le R}} \sum_{g=1}^{G} \left| X_{i,g} - \sum_{r=1}^{R} \sum_{j=1}^{N} w_{kj,r}^{(R)} \hat{H}_{ij,g} c_{m_r} \right|^2 \right)$$

where $\hat{y}$ represents the determined PMI, X represents the received user specific data and control signals, w represents the known candidates for the PMIs, $\hat{H}$ represents a channel response estimated from the common reference signal in a given frequency domain, c represents the known modulation constellation, K represents a number of precoding vectors in the PMI, L represents a number of sub-carriers, M represents the total of known modulation constellations and $m_r$ represents the available modulation constellations for each rank, N represents a number of transmit antennas used for the common reference signal, R represents a rank for at least one of a data and control signal and G represents a number of receive antennas.

14. The method of claim 13 wherein minimizing the objective function comprises minimizing over a number of transmit and receive antennas used for at least one of a data and control signal.

15. The method of claim 13 wherein minimizing the objective function comprises minimizing for a total number of possible PMI vectors used to transmit data over a shared channel and signaling over the control channel.

* * * * *